United States Patent
Jung et al.

(10) Patent No.: US 9,274,860 B2
(45) Date of Patent: Mar. 1, 2016

(54) MULTI-PROCESSOR DEVICE AND INTER-PROCESS COMMUNICATION METHOD THEREOF

(75) Inventors: Won-Seok Jung, Seoul (KR); Wooseok Chang, Seongnam-si (KR); Hyoung-Jin Yun, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 164 days.

(21) Appl. No.: 13/110,411

(22) Filed: May 18, 2011

(65) Prior Publication Data

US 2011/0289284 A1    Nov. 24, 2011

(30) Foreign Application Priority Data

May 19, 2010 (KR) ........................ 10-2010-0046986

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |

(52) U.S. Cl.
CPC ..................................... *G06F 9/544* (2013.01)

(58) Field of Classification Search
None
See application file for complete search history.

(56) References Cited

U.S. PATENT DOCUMENTS

| | | | | |
|---|---|---|---|---|
| 5,761,427 | A * | 6/1998 | Shah et al. | 709/223 |
| 6,976,131 | B2 | 12/2005 | Pentkovski et al. | |
| 7,797,496 | B2 * | 9/2010 | Gruber et al. | 711/147 |
| 2002/0152355 | A1 * | 10/2002 | Otterness et al. | 711/114 |
| 2004/0225760 | A1 * | 11/2004 | Lee | 710/22 |
| 2005/0235290 | A1 * | 10/2005 | Jefferson et al. | 719/310 |
| 2008/0126750 | A1 * | 5/2008 | Sistla | 712/30 |
| 2008/0229325 | A1 * | 9/2008 | Supalov | 719/312 |

FOREIGN PATENT DOCUMENTS

JP    2003-030042    1/2003

OTHER PUBLICATIONS

Brett D. Fleisch and Gerald J. Popek, "Mirage: A Coherent Distributed Shared Memory Design," 1989, Association of Computing Machinery, ACM 089791-338-3/89/0012/0211, p. 211.*

* cited by examiner

*Primary Examiner* — Tuan Dao
*Assistant Examiner* — William C Wood
(74) *Attorney, Agent, or Firm* — Lee & Morse, P.C.

(57) ABSTRACT

Provided are a multi-process device and an inter-process communication (IPC) method thereof. The multi-processor device includes a first processor, a second processor, a first memory connected to the first processor, and a second memory connected to the second processor. When an inter-process communication (IPC) operation is performed between the first processor and the second processor, data is exchanged between the first memory and the second memory.

16 Claims, 11 Drawing Sheets

MULTI-PROCESSOR DEVICE AND INTER-PROCESS COMMUNICATION METHOD THEREOF

CROSS-REFERENCE TO RELATED APPLICATIONS

This application claims priority under 35 U.S.C. §119 to Korean Patent Application No. 10-2010-0046986, filed on May 19, 2010, in the Korean Intellectual Property Office, and entitled: "Multi-Processor Device and Inter-Process Communication Method Thereof," which is incorporated by reference herein in its entirety. is incorporated by reference herein in its entirety.

BACKGROUND

1. Field

The present disclosure herein relates to processor devices and, more particularly, to a multi-processor device and an inter-process communication method thereof.

2. Description of the Related Art

In recent years, multi-processors are gaining importance as performance improvements of single processors is becoming harder to achieve with increased limitations. Various efforts on performance improvements achieved by increasing clock speed were made to improve performance of processors. However, recently more studies are focusing on multi-processors whose functions are improved by increasing the number of processors.

A typical multi-processor device includes a shared memory to perform inter-process communication (IPC). That is, one processor (processor "A") stores data to be processed by another processor (processor "B") in the shared memory. The processor "B" accesses the data stored in the shared memory to process the data.

In this case, the processor "B" cannot write data into the shared memory while the processor "A" writes data into the shared memory. That is, write waiting time occurs. The write waiting time causes speed of a multi-processor device to decrease.

SUMMARY

One or more embodiments provide a multi-processor device.

One or more embodiments may provide a multi-processor device, including a first processor, a second processor, a first memory connected to the first processor, and a second memory connected to the second processor, wherein each of the first processor and the second processor is configured to perform an inter-process communication (IPC) operation for exchanging data between the first memory and the second memory.

The first memory may include a first transmission region configured to store data to be transmitted to the second memory and a first reception region configured to store data received from the second memory, and wherein the second memory may include a second transmission region configured to store data to be transmitted to the first memory and a second reception region configured to store data received from the first memory.

The data stored in the first transmission region may be copied to the second reception region and the data stored in the second transmission region may be copied to the first reception region when an IPC operation is performed between the first processor and the second processor.

The first processor may copy the data stored in the second transmission region to the first reception region and the second processor may copy the data stored in the first transmission region to the second reception region when an IPC operation is performed between the first processor and the second processor.

The first processor may perform a copy operation in response to an interrupt signal received from the second processor and the second processor may perform a copy operation in response to an interrupt signal received from the first processor.

The multi-processor device may further include a direct memory access (DMA) configured to copy the data stored in the first transmission region to the second reception region and copy the data stored in the second transmission region to the first reception region when an IPC operation is performed between the first processor and the second processor.

The DMA may be configured to perform a copy operation in response to a flag signal received from the first processor or the second processor.

The DMA may include a buffer configured to temporarily store the data stored in the first transmission region or the second transmission region.

The first memory may include a transmission region configured to store data to be transmitted to the second memory, and a reception region configured to store data received from the second memory.

Data may be written into the transmission region using a circular queue.

The circular queue may include at least two nodes configured to store data, and first and second pointers configured to indicate address values of the at least two nodes, wherein the first and second pointers may have different address values when data is stored in the at least two nodes.

The second processor may determine whether the address values of the first and second pointers are identical to each other and copies data stored in the first memory to the second memory when the addresses values of the first and second pointers are different from each other.

A direct memory access (DMA) may be configured to determine whether the address values of the first and second pointers are identical to each other and copy data stored in the first memory to the second memory when the address values of the first and second pointers are different from each other.

One or more embodiments may provide an inter-process communication (IPC) method of a multi-processor device provided with a first processor and a second processor, the IPC method including storing data into a first memory connected to the first processor, copying the data stored in the first memory to a second memory connected to the second processor, and processing the data copied to the second memory.

The copying may be performed by the second processor.

The multi-processor device may further include a direct memory access (DMA) configured to perform the copying.

The first memory may include a transmission region configured to store data to be transmitted to the second memory, and the DMA may copy data stored in the transmission region to the second memory.

Data may be written into the first and second memories using a circular queue.

The circular queue may include at least two nodes configured to store data and first and second pointers configured to indicate address values of the at least two nodes, and the IPC method further include determining whether the address values of the first and second pointers are identical to each other.

An IPC operation may be performed when the address values of the first and second pointers are different from each other.

One or more embodiments may provide a multi-processor device, including a first processor, a second processor, a first memory connected to the first processor and including a first transmission region and a first reception region, and a second memory connected to the second processor and including a second transmission region and a second reception region, wherein data to be transmitted to the second processor may be stored in the first transmission region while data to be transmitted to the first processor may be stored in the second transmission region.

Data to be transmitted to the second processor may be stored in the first transmission region before being stored in the second reception region, and data to be transmitted to the first processor may be stored in the second transmission region before being stored in the first reception region.

The first transmission region may be configured to store data from the first processor to be transmitted to the second reception region, and the first reception region is configured to store data to be processed by the first processor, the second transmission region may be configured to store data from the second processor to be transmitted to the first processor, and the second reception region is configured to store data to be processed by the second processor.

BRIEF DESCRIPTION OF THE DRAWINGS

Features will become more apparent to those of ordinary skill in the art by describing in detail exemplary embodiments with reference to the attached drawings, in which.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when an element is referred to as being "connected to" or "coupled to" another element, it can be directly connected or coupled to the other element, or one or more intervening elements may also be present. Further, it will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the disclosure.

Figure 1:
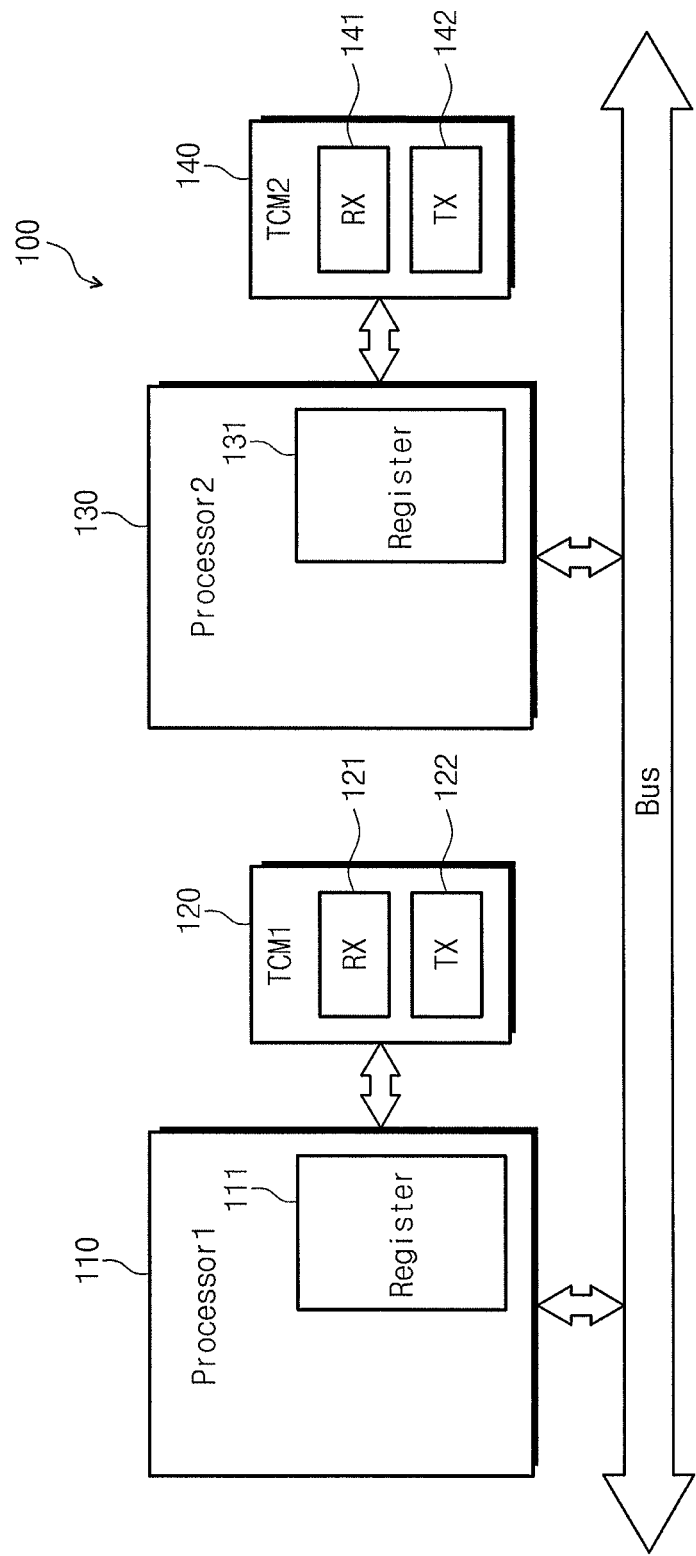
FIG. 1 illustrates a block diagram of an exemplary embodiment of a multi-processor device.

FIG. 1 illustrates a block diagram of an exemplary embodiment of a multi-processor device 100. The multi-processor device 100 includes at least two processors. A multi-processor device 100 including two processors is exemplarily shown in FIG. 1.

Referring to FIG. 1, the multi-processor device 100 may include a first processor 110, a first tightly coupled memory (TCM) 120, a second processor 130, and a second TCM 140.

The first processor 110 and the second processor 130 may perform a task divisionally. The first processor 110 and the second processor 130 may operate independently. In order to perform one task together, the first processor 110 and the second processor 130 must exchange data according to a series of rules. For example, transmission or reception of data between the first processor 110 and the second processor 130 may be referred to as "inter-process communication (IPC)".

The first processor 110 and the second processor 130 may include a first register 111 and a second register 131, respectively. For example, data to be transmitted by inter-process communication (IPC) may be stored in the first register 111 and the second register 131. For example, data received by the IPC may be stored in the first register 111 and the second register 131.

In one or more embodiments, the first processor 110 and the second processor 130 may be the same kind of processors. That is, the multi-processor device 100 shown in FIG. 1 may have a symmetric multi-processor (SMP) structure. For example, the first processor 110 and the second processor 130 may perform parallel processing for a task. For example, the first processor 110 and the second processor 130 may process a task assigned at a threshold level. For example, the first processor 110 and the second processor 130 may process a task assigned at an instruction level.

In one or more embodiments, the first processor 110 and the second processor 130 may be different kinds of processors. That is, the multi-processor device 100 shown in FIG. 1 may have an asymmetric multi-processor (AMP) structure. For example, the first processor 110 may be an advanced RISC machine (ARM) processor and the second processor 130 may be a digital signal processing (DSP) processor.

The first tightly coupled memory (TCM) 120 may be connected to the first processor 110. The first TCM 120 may include a reception region 121 and a transmission region 122. The second TCM 140 may be connected to the second processor 130. The second TCM 120 may include a reception region 141 and a transmission region 142.

For example, when inter-process communication (IPC) is performed, data stored in the transmission region 142 of the second TCM 140 may be copied to the reception region 121 of the first TCM 120. For example, data stored in the transmission region 122 of the first TCM 120 may be copied to the reception 141 of the second TCM 140.

Similarly, e.g., data stored in the transmission region 122 of the first TCM 120 may be copied to the reception region 141 of the second TCM 140. For example, data stored in the transmission region 142 of the second TCM 140 may be copied to the reception region 121 of the first TCM 120.

In general, a multi-processor device includes a shared memory to perform inter-process communication (IPC). For example, one processor (processor "A") writes data to be transmitted to another processor (processor "B") in the shared memory. The processor "B" reads and processes the data stored in the shared memory. In this case, the processor "B" cannot write data in the shared memory while the processor "A" writes data into the shared memory. In such cases, write waiting time occurs.

In one or more embodiments, the multi-processor device 100 shown in FIG.1 includes a tightly coupled memory (TCM) to perform inter-process communication (IPC). That is, the first processor 110 and the second processor 130 may write data into the first TCM 120 and the second TCM 140, respectively. One or more embodiments improve data processing time by reducing and/or eliminating write waiting times by employing TCM.

In addition, in one or more embodiments, the tightly coupled memories (TCMs), e.g., TCM1 120, TCM2 140, of the multi-processor device 100 may each include a reception region RX, e.g., 121, 141, and a transmission region TX, e.g., 122, 142. Each of processors, e.g., 110, 130, may write data into their reception region RX, e.g., 121, 141, from another of the processors via, e.g., another of TCMs, while processing data stored in their transmission region TX, e.g., 122, 142 to another of the processors. As a result, data processing speed may be improved. The operation of the multi-processor device 100 according to an embodiment of the inventive concept will now be described hereinafter in detail.

Figure 2:
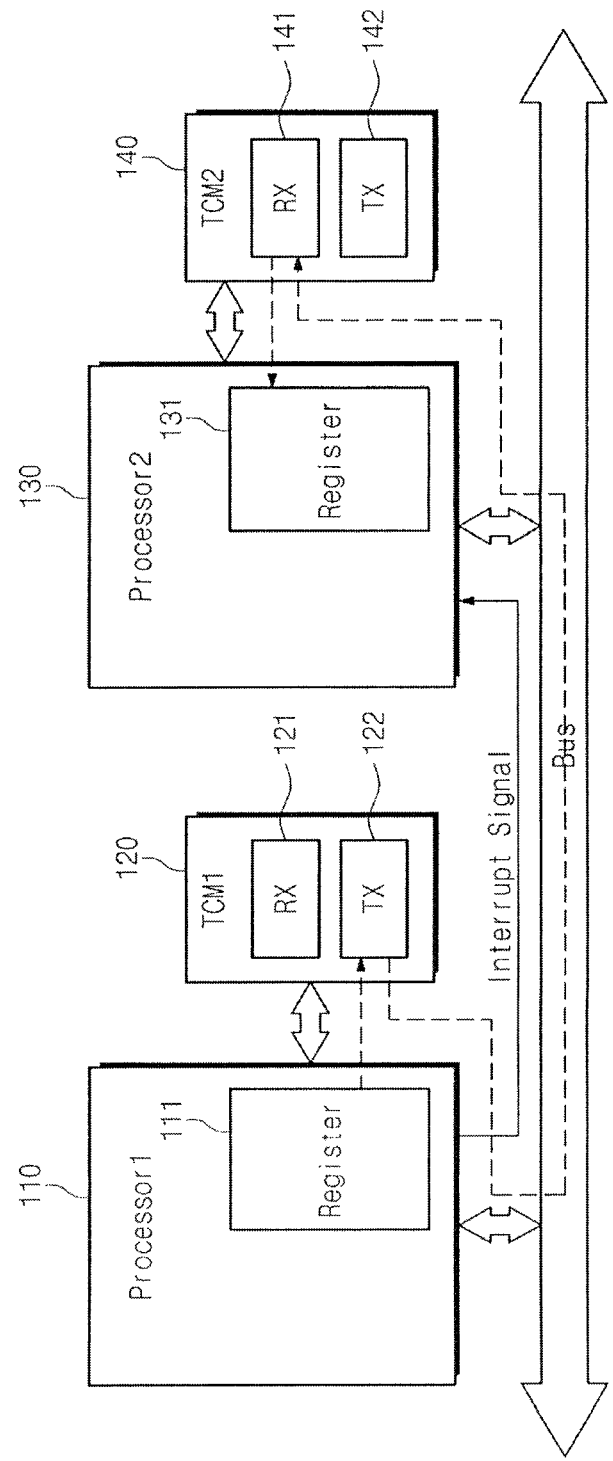
FIG. 2 illustrates a block diagram of an exemplary inter-process communication operation of the multi-processor device shown in FIG. 1.

FIG. 2 illustrates a block diagram of an exemplary inter-process communication operation of the multi-processor device 100 shown in FIG. 1. For brevity of explanation, an exemplary scenario of an inter-process communication operation from the first processor 110 to the second processor 130 is described below. More particularly, an exemplary scenario of data being transmitted from the first processor 110 to the second processor 130 is described below.

The first processor 110 may store data to be processed by the second processor 130 in a first register 111. The first processor 110 may write the data stored in the first region 111 into the transmission region 122 of the first TCM 120. Thereafter, the first processor 110 may transmit an interrupt signal to the second processor 130. That is, the first processor 110 may inform the second processor 130 that data is written into the transmission region 122 of the first TCM 120.

The second processor 130 may copy the data stored in the transmission region 122 of the first TCM 120 to the reception region 141 of the second TCM 140 in response to the interrupt signal.

More specifically, the second processor 130 may access the transmission region 122 of the first TCM 120 in response to the interrupt signal. The second processor 130 may read the data stored in the transmission region 122 and write the read data into the reception region 141 of the second TCM 140. Thereafter, the second processor 130 may write the data stored in the reception region 141 of the second TCM 140 into the second register 131. The second processor 130 may then process the data stored in the second register 131.

An IPC operation from the second processor 130 to the first processor 110 is similar to the IPC operation from the first processor 110 to the second processor 130. Therefore, a description thereof will not be repeated.

Figure 3:
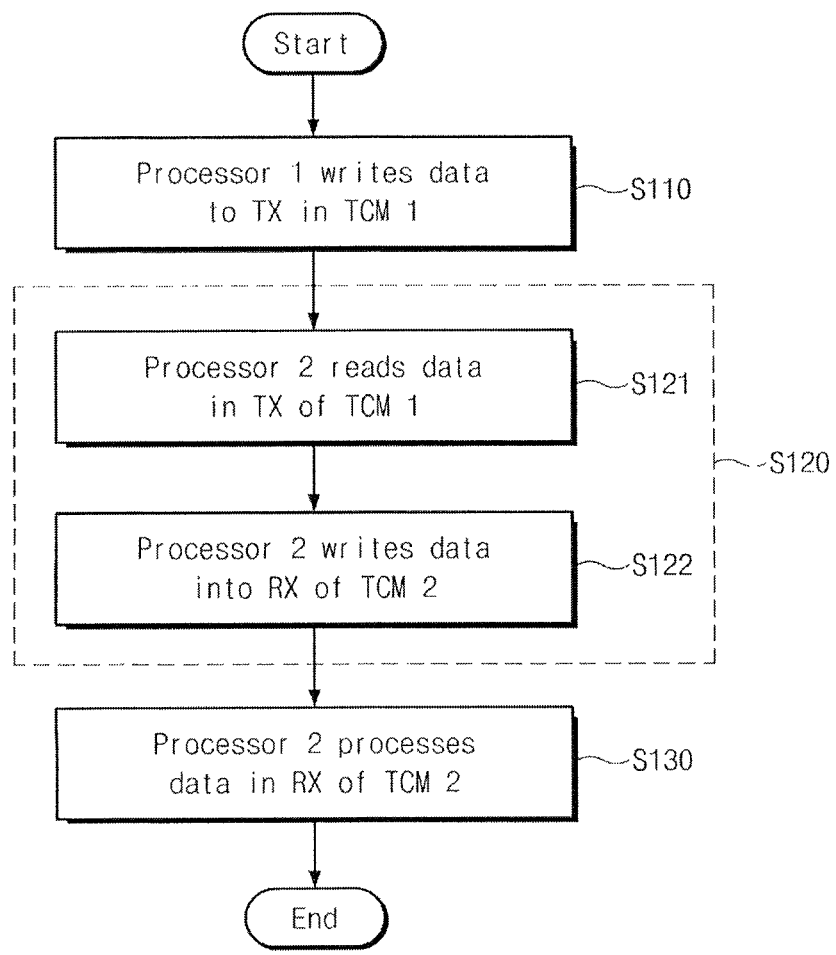
FIG. 3 illustrates a flowchart of an exemplary inter-process communication operation of the multi-processor device shown in FIG. 1.

FIG. 3 illustrates a flowchart of an exemplary inter-process communication operation of the multi-processor device 100 shown in FIG. 1. For brevity of explanation, it is assumed that an inter-process communication operation from the first processor 110 to the second processor 130 is performed.

At S110, the first processor 110 may write data into the transmission region 122 of the first TCM 120. That is, the first processor 110 may write data to be processed by the second processor 130 into the transmission region 122 of the first TCM 120. In one or more embodiments, the first processor 110 may transmit an interrupt signal to the second processor 130.

At S120, the data stored in the transmission region 122 of the first TCM 120 may be copied to the reception region 141 of the second TCM 140.

More specifically, the second processor 130 may read the data stored in the transmission region 122 of the first TCM 120 (S121). That is, the second processor 130 may access the transmission region 122 of the first TCM 120 in response to an interrupt signal and may perform a read operation for the data stored in the transmission region 122. Thereafter, the second processor 130 may write the read data into the reception region 141 of the second TCM 140 (S122).

At S130, the second processor 130 may process the data stored in the reception region 141 of the second TCM 140. That is, the second processor 130 may write the data stored in the reception region 141 of the second TCM 140 into the second register 131. The second processor 130 may process the data stored in the second register 131.

Figure 4:
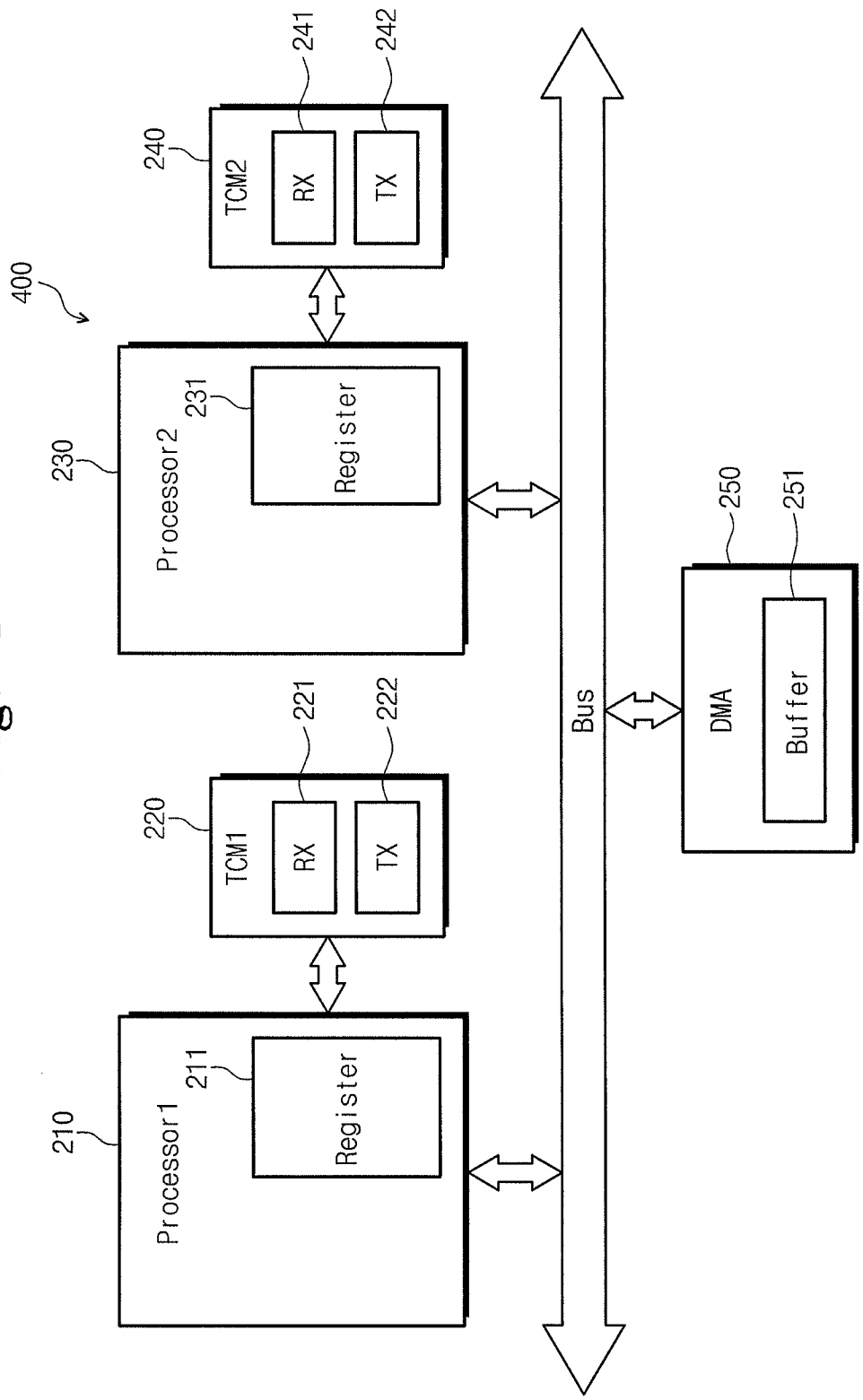
FIG. 4 illustrates a block diagram of another exemplary embodiment of a multi-processor device.

FIG. 4 illustrates a block diagram of an exemplary embodiment of a multi-processor device 400. The multi-processor device 400 may include at least two processors. While FIG. 4 illustrates the multi-processor device 400 including two processors, embodiments are not limited to two processors.

Referring to FIG. 4, the multi-processor device 400 may include a first processor 210, a first TCM 220, a second processor 230, a second TCM 240, and a direct memory access (DMA). The multi-processor device 400 shown in FIG. 4 is similar to the multi-processor device 100 shown in FIG. 1. In general, only the differences between the exemplary multi-processor device 100 of FIG. 1 and the exemplary multi-processor device 400 of FIG. 4 will be described below.

The first processor 210 and the second processor 230 may include a first register 211 and a second register 231, respectively. The first processor 210 may be connected to the first TCM 220, and the second processor 230 may be connected to the second TCM 240. The first processor 210 and the second processor 230 may be similar to the first processor 110 and the second processor 130 shown in FIG. 1.

The first TCM 220 may include a transmission region 222 and a reception region 221. The second TCM 240 may include a transmission region 242 and a reception region 241. The first TCM 220 and the second TCM 240 may be similar to the first TCM 120 and the second TCM 140 shown in FIG. 1.

Referring to FIG. 4, the multi-processor device 200 includes the direct memory access (DMA) 250. The DMA 250 may include a buffer 251 therein. The DMA 250 may control a data transmission operation between the first TCM 220 and the second TCM 240.

For example, when inter-process communication (IPC) is performed, the DMA 250 may access the first TCM 220 or the second TCM 240. For example, the DMA 250 may store data stored in the transmission region 222 of the first TCM 220 in the buffer 251 and may copy the data stored in the buffer 251 to the reception region 241 of the second TCM 240. For example, the DMA 250 may store the data stored in the transmission region 242 of the second TCM 220 and may copy the data stored in the transmission region 242 to the reception region 221 of the first TCM 220.

The multi-processor device 200 may use a tightly coupled memory (TCM) to perform inter-process communication (IPC). That is, the first processor 220 and the second processor 230 may write data into the first TCM 220 and the second TCM 240, respectively. Thus, write waiting time may be eliminated and data processing speed may be improved.

In addition, tightly coupled memories (TCMs) of the multi-processor device 400 shown in FIG. 4 may each include a reception region RX and a transmission region TX. Thus, each processor may write data into the transmission region TX thereof while processing data stored in the reception region RX thereof and two or more of the processors may carry out such functions simultaneously. More particularly, e.g., the first processor 210 may store data to be transmitted to the second processor 230 in the first TCMs transmission region 222 and/or the first processor may access the data stored in the second TCMs transmission region 242 while the second processor 230 stores data to be transmitted to the first processor 210 in the second TCMs transmission region 242 and/or the second processor 230 access the data stored in the first TCMs transmission region 222. As a result, data processing speed may be improved. An exemplary operation of the multi-processor device 400 will now be described hereinafter in detail.

Figure 5:
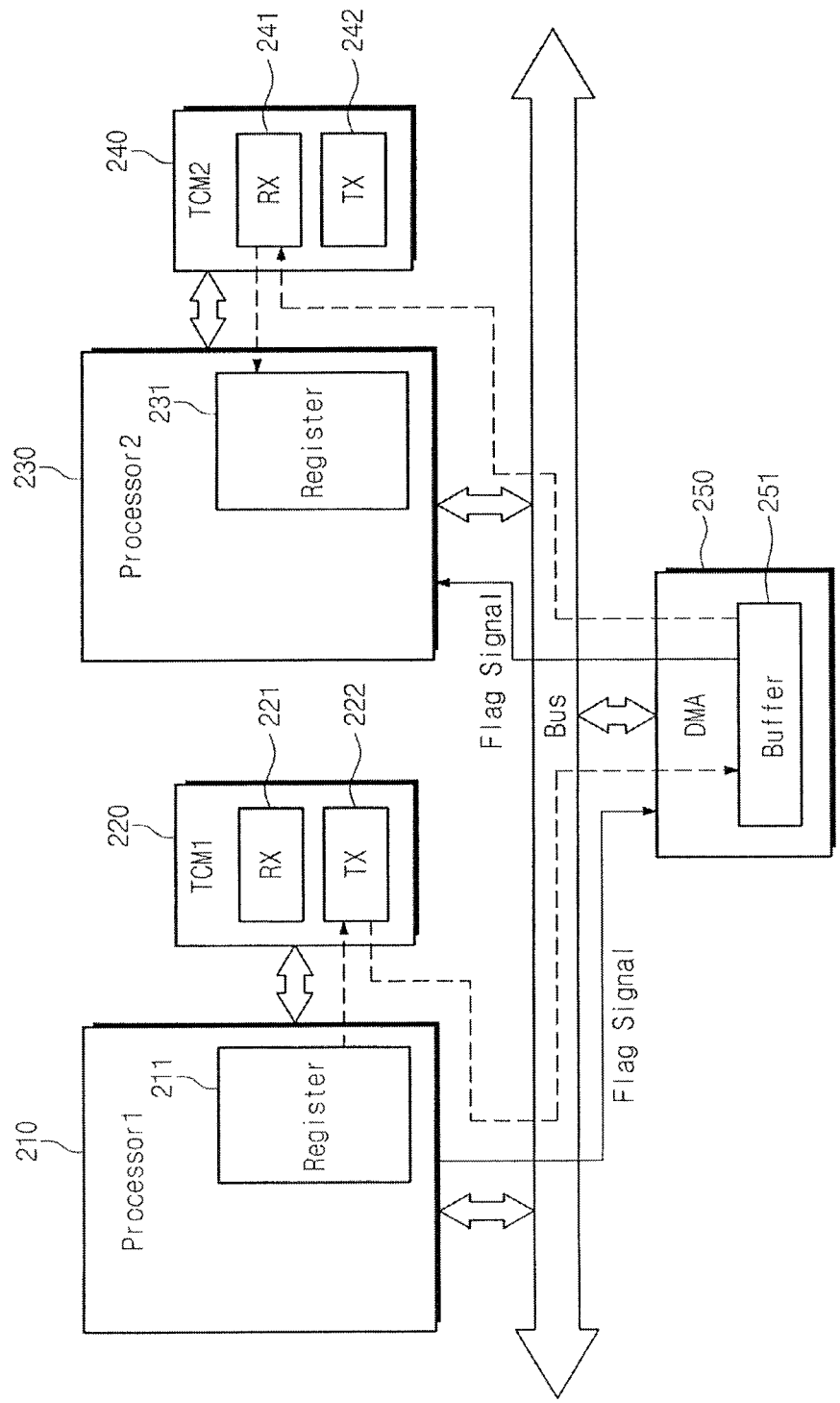
FIG. 5 illustrates a block diagram of an exemplary inter-process communication operation of the multi-processor device shown in FIG. 4.

FIG. 5 illustrates a block diagram of an exemplary inter-process communication operation of the multi-processor device 400 shown in FIG. 4. For brevity of explanation, an exemplary scenario of an inter-process communication operation from the first processor 210 to the second processor 230 is described below. More particularly, an exemplary scenario of data being transmitted from the first processor 210 to the second processor 230 is described below.

The first processor 210 may store data to be processed by the second processor 230 in the first register 211. The first processor 210 may write the data stored in the first register 211 into the transmission region 222 of the first TCM 220. Thereafter, the first processor 210 may transmit a flag signal to the DMA 250. More particularly, e.g., the first processor 210 may inform the DMA 250 that data is written into the transmission region 222.

The DMA 250 may copy the data stored in the transmission region 222 of the first TCM 220 to the reception region 241 of the second TCM 240 in response to the flag signal.

More specifically, the DMA 250 may access the transmission region 222 of the first TCM 220 in response to a flag signal. The DMA 250 may read the data stored in the transmission region 222 and may store the data stored in the transmission region 222 in the buffer 251. The DMA 250 may access the reception region 241 of the second TCM 240. The DMA 250 may write the data stored in the buffer 251 into the reception region 241. Thereafter, the DMA 250 may transmit the flag signal to the second processor 230. That is, the DMA 250 may inform the second processor 230 that the data is written into the reception region 241 of the second TCM 240.

The second processor 230 may write the data stored in the reception region 241 of the second TCM 240 into the second register 231. The second processor 230 may process the data stored in the second register 231.

An inter-process communication (IPC) operation from the second processor 230 to the first processor 210 may be similar to the IPC operation from the first processor 210 to the second processor 230 and will not be explained in further detail.

It should be understood that the above explanations are exemplary and embodiments are not limited thereto.

Referring to FIG. 5, e.g., in one or more embodiments, the first processor 210 may transmit a flag signal to the DMA 250. While a flag signal is employed in the exemplary embodiment of FIG. 5, in one or more other embodiments, e.g., the first processor 210 may not generate a flag signal. More particularly, e.g., the DMA 250 may frequently access the transmission region 222 of the first TCM 220. When there is new data in the transmission region 222 of the first TCM 220, the DMA 250 may copy the data of the transmission region 222 of the first TCM 220 to the reception region 241 of the second TCM 240.

Referring still to FIG. 5, in one or more embodiments, the DMA 250 may transmit a flag signal to the second processor 230. While a flag signal is employed in the exemplary embodiment of FIG. 5, in one or more other embodiments, e.g., the DMA 250 may not generate a flag signal. In one or more embodiments, e.g., the second processor 230 may frequently access the reception region 241 of the second TCM 240. When there is new data in the reception region 241 of the second TCM 240, the second processor 230 may copy the data of the reception region 241 of the second TCM 240 to the second register 231.

Moreover, it has been explained in FIGS. 1 to 6 that an inter-process communication (IPC) operation may be performed using a tightly coupled memory (TCM). However, it will be understood that these explanations are exemplary. For example, the TCM in FIGS. 1 to 5 may be substituted with a cache memory.

Figure 6:
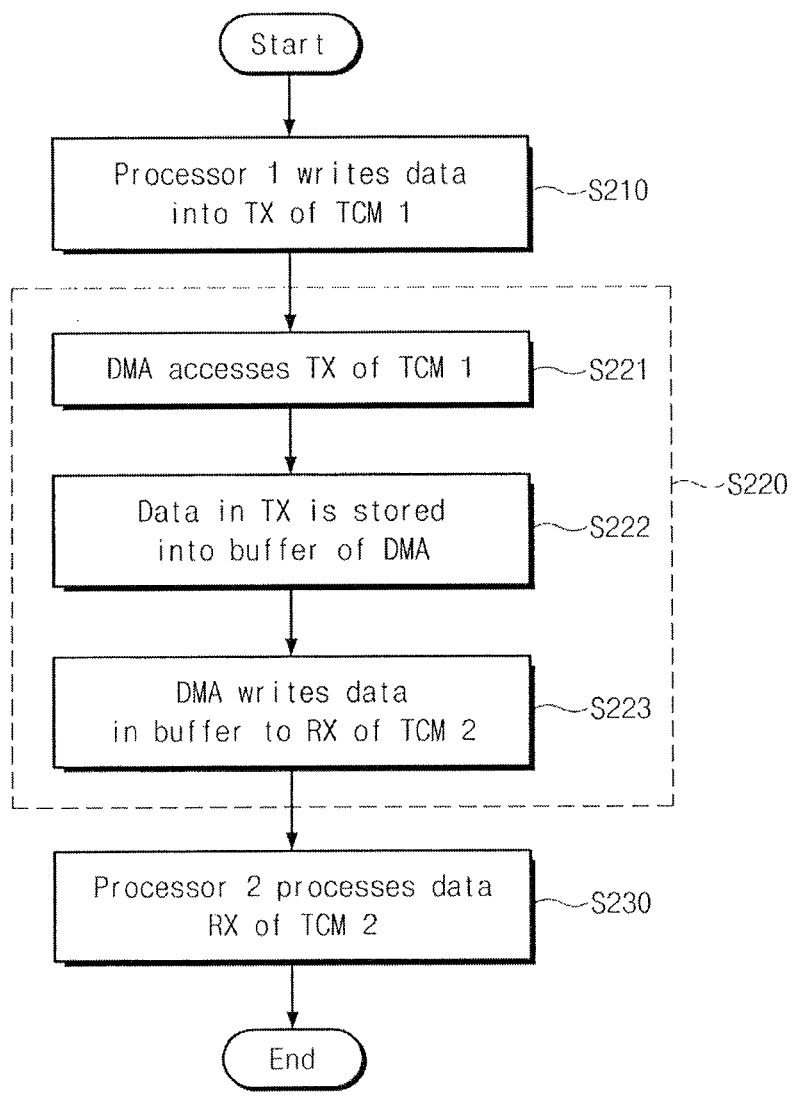
FIG. 6 illustrates a flowchart of an exemplary inter-process communication operation of the multi-processor device shown in FIG. 4.

FIG. 6 illustrates a flowchart of an exemplary embodiment of an inter-process communication operation of the multi-processor device 200 shown in FIG. 4. An exemplary scenario of an inter-process communication (IPC) operation from the first processor 210 to the second processor 230 is described below.

At S210, the first processor 210 may write data into the transmission region 222 of the first TCM 220. That is, the first processor 210 may write data to be processed by the second processor 230 into the transmission region 222 of the first TCM 220.

At S220, the data stored in the transmission region 222 of the first TCM 220 may be copied to the reception region 241 of the second TCM 240.

More particularly, the DMA 250 may access the transmission region 222 of the first TCM 220 (S221). The data stored in the transmission region 222 of the first TCM 220 may be stored in the buffer 251 of the DMA 250 (S222). That is, the DMA 250 may read the data stored in the transmission region 222 of the first TCM 220 and may store the read data in the buffer 251. The DMA 250 may write the data stored in the buffer 251 into the reception region 241 of the second TCM 240 (S223).

At S230, the second processor 230 may process the data stored in the reception region 241 of the second TCM 240. For example, the second processor 230 may write the data stored in the reception region 241 of the second TCM 240 into the second register 231. The second processor 230 may process the data stored in the second register 231.

Data may be written into a reception region RX or a transmission region TX of a tightly coupled memory (TCM) in FIG. 1 or 4 using various methods. An exemplary method for writing data into a reception region RX or a transmission region TX of a tightly coupled memory (TCM) will be described below.

Figure 7:
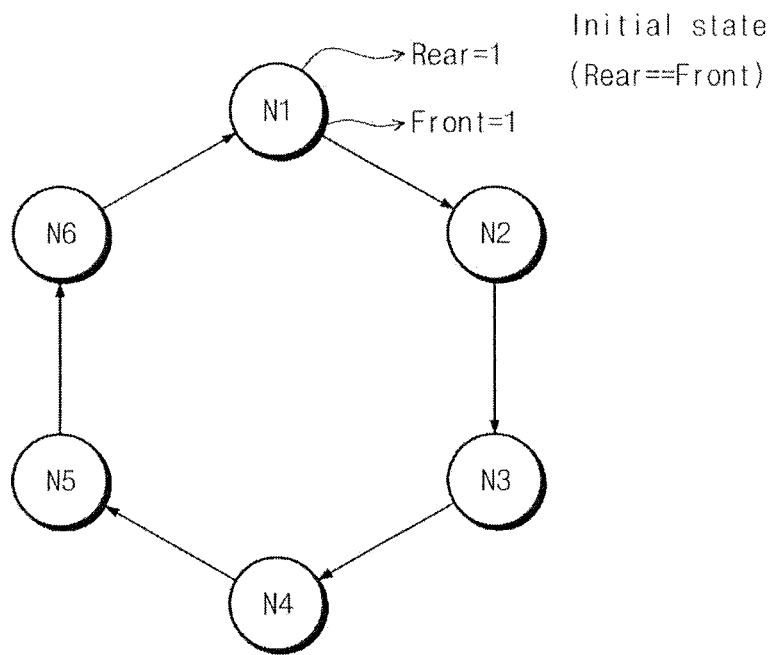
FIG. 7 illustrates a schematic diagram of an exemplary circular queue in an initial state.
Figure 8:
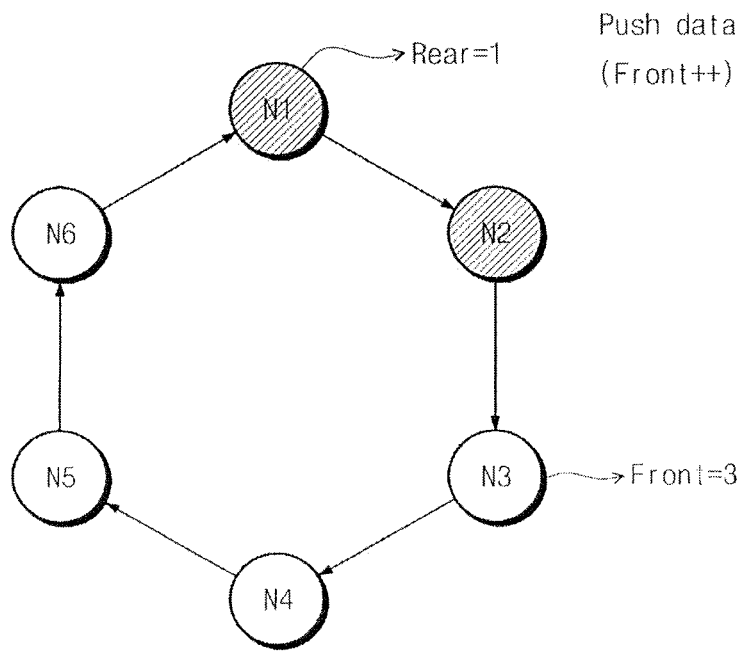
FIG. 8 illustrates a schematic diagram of an exemplary data push operation of the circular queue shown in FIG. 7.
Figure 9:
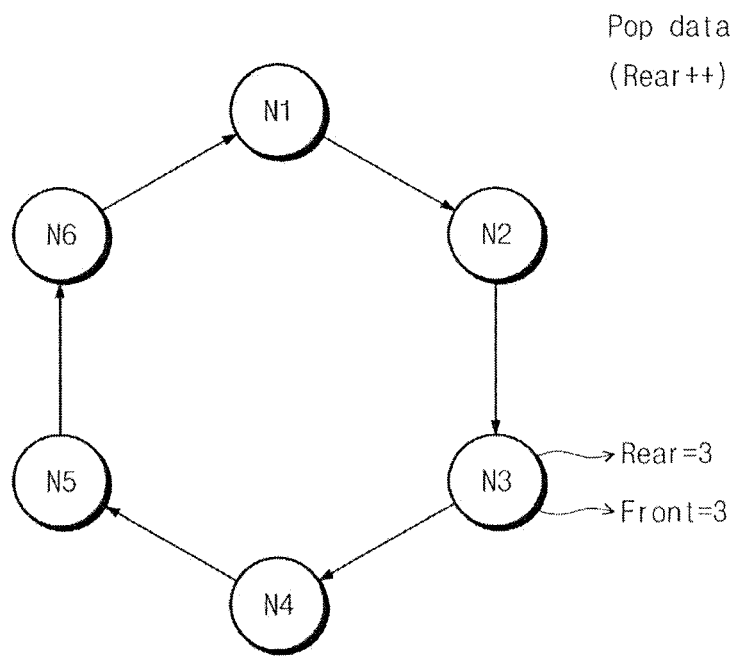
FIG. 9 illustrates a schematic diagram of an exemplary data POP operation of the circular queue shown in FIG. 7.

FIGS. 7 to 9 illustrate diagrams for explaining an exemplary method for writing data into a reception region RX or a transmission region TX of a TCM. More particularly, FIGS. 7 to 9 illustrate schematic diagrams for describing an exemplary method for writing data into a reception region RX or a transmission region TX of a TCM using a circular queue. In one or more embodiments, the TCM may include a first TCM and/or a second TCM shown in FIG. 1 or 4.

A circular queue according to an embodiment of the inventive concept may include N nodes (N being an integer greater than or equal to 2). As an example, a circular queue in FIGS. 7 to 9 may include six nodes. The circular queue may include a front pointer and a rear pointer.

FIG. 7 illustrates a schematic diagram of an exemplary circular queue in an initial state. The term "initial state" corresponds to a state where data is not stored in first to sixth nodes N1~N6.

Referring to FIG. 7, a front pointer and a rear pointer of the circular queue may have the same address value in the initial state. That is, the front pointer and the rear pointer of the circular queue may indicate the same node in the initial state.

For example, the front pointer and the rear pointer may each have an address value of '1'. In this case, for example, the front pointer and the rear pointer each indicate the first node N1.

FIG. 8 illustrates a schematic diagram of an exemplary data push operation of the circular queue shown in FIG. 7. An exemplary operation of writing data into the circular queue may be referred to as "data push operation". As an example, a case of writing data into the first node N1 and the second node N2 is illustrated in FIG. 8.

Referring to FIG. 8, an address value of the front pointer may increase when data is written. The rear pointer may be maintained at the same address value.

For example, when data is written into the first node N1 and the second node N2, the front pointer may have an address value of '3'. That is, an address value of the front pointer may increase from '1' to '3'. In one or more embodiments, an address value of the rear pointer may be maintained at '1'. As a result, the front pointer and the rear pointer may have different address values when data is stored in the circular queue.

FIG. 9 illustrates a schematic diagram of an exemplary data pop operation of a circular queue. An operation of erasing data at a node of the circular queue may be referred to as "data pop operation". As an example, a case of erasing data at a first node N1 and a second node N2 is illustrated in FIG. 9.

Referring to FIG. 9, an address value of the rear pointer increases when data is erased. In this case, the front pointer is maintained at the same address value.

In one or more embodiments, a multi-processor device may write data into a reception region RX or a transmission region TX of a TCM using a circular queue explained in FIGS. 7 to 9.

In this case, an address value of a front pointer of the circular queue and an address value of a rear pointer of the circular queue may be managed by different processors, respectively. For example, the address value of the front pointer may be managed by a processor performing a data push operation and the address value of the rear pointer may be managed by a processor performing a data pop operation.

By enabling the address values of the front pointer and the rear pointer to be managed by different processors, one or more embodiments of the multi-processor device may not need a semaphore for protecting the front pointer and the rear pointer.

Referring back to FIG. 1, e.g., an exemplary scenario of data being written into a circular queue of the transmission region 122 of the first TCM 120 is described below. More particularly, an exemplary scenario in which a data push operation is performed by the first processor 110 is described below. In such embodiments, the first processor 110 may increase an address value of a front pointer. Additionally, the first processor 110 may transmit an interrupt signal to the second processor 130.

The second processor 130 may access the transmission region 122 of the first TCM 120 in response to an interrupt signal. At this point, the second processor 130 may copy data written into the circular queue of the transmission region 122 of the first TCM 120 to the reception region 141 of the second TCM 140. The second processor 130 may perform a data pop operation and increase an address value of the rear pointer.

As another example, referring to FIG. 4, an exemplary scenario of data being written into a circular queue of the transmission region 222 of the first TCM 220 is described. More particularly, an exemplary scenario in which a data push operation is performed by the first processor 210 is described below. In this case, the first processor 210 may increase an address value of the front pointer. Additionally, the first processor 210 may transmit a flag signal to the DMA 250.

In one or more embodiments employing a circular queue, e.g., as explained in FIGS. 7 to 9, it may be determined whether data is written into a reception region RX or a transmission region TX of a TCM, by determining whether address values of a front pointer and a rear pointer are identical to each other.

Referring to FIG. 1, in one or more embodiments, the first processor 110 may not generate an interrupt signal. In such embodiments, the second processor 130 may frequently access the transmission region 122 of the first TCM 120. The second processor 130 may determine whether address values of the front pointer and the rear pointer of the reception region 122 of the first TCM 120 are identical to each other.

When the address values of the front pointer and the rear pointer are different from each other, the second processor 130 may determine that data is written into the reception region 122 of the first TCM 120. In one or more embodiments, the second processor 130 may copy data written into a circular queue of the transmission region 122 of the first TCM 120 to the reception region 141 of the second TCM 140. When the address values of the front pointer and the rear pointer are identical to each other, the second processor 130 may determine that data is written into the transmission region 122 of the first TCM 120.

As another example, referring to FIG. 4, in one or more embodiments, the first processor 210 may not generate a flag signal. In such embodiments, the DMA 250 may frequently access the transmission region of the first TCM 220. In such embodiments, the DMA 250 may determine whether address values of the front pointer and the rear pointer are identical to each other.

When the address values of the front pointer and the rear pointer are different from each other, the DMA 250 may determine that data is written into the transmission region 222 of the first TCM 220. In this case, the DMA 250 may copy data written into a circular queue of the transmission region 222 of the first TCM 220 to the reception region 241 of the second TCM 240. When the address values of the front pointer and the rear pointer are identical to each other, the DMA 250 may determine that data is not written into the transmission region 222 of the first TCM 220.

Figure 10:
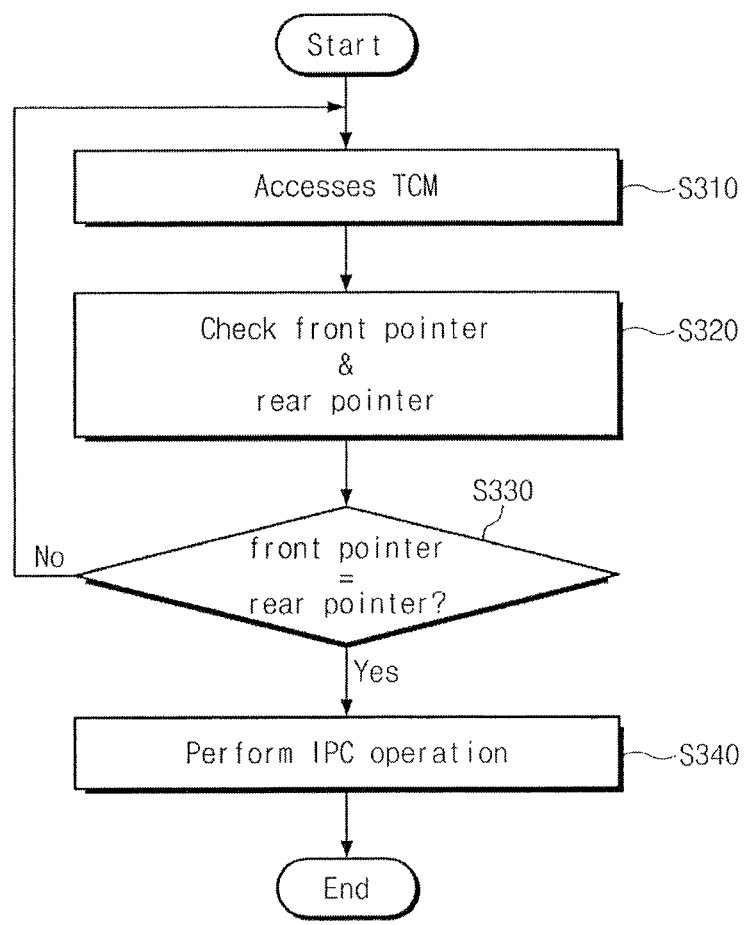
FIG. 10 illustrates a flowchart of an exemplary inter-process communication operation of another exemplary embodiment of a multi-processor device.

FIG. 10 illustrates a flowchart of an exemplary embodiment of an inter-process communication operation of a multi-processor device. More particularly, an inter-process communication (IPC) operation employing a frequent access of a tightly coupled memory (TCM) scenario will be exemplarily described below with reference to FIG. 10.

At S310, a TCM may be accessed. As an example, referring to FIG. 1, the second processor 130 may frequently access the transmission region 122 of the first TCM 120. As another example, referring to FIG. 4, the DMA 250 may frequently access the transmission region 222 of the first TCM 220.

At S320, address values of a front pointer and a rear pointer of the TCM may be checked. As an example, referring to FIG. 1, the second processor 130 may check an address value of the front pointer of the transmission region 122 of the first TCM 120 and an address value of the rear pointer of the transmission region 122 of the first TCM 120. As another example, the DMA 250 may check an address value of the front pointer of the transmission region 222 of the first TCM 220 and an address value of the rear pointer of the transmission region 222 of the first TCM 220.

At S330, it is determined whether the address values of the front pointer and the rear pointer of the respective TCM are identical to each other.

When the address values of the front pointer and the rear pointer are identical to each other, an inter-process communication (IPC) operation may be performed (S340). More particularly, e.g., referring to FIG. 1, the second processor 130 may copy data written into the transmission region 122 of the first TCM 120 to the reception region 141 of the second TCM 140. The second processor 130 may process the data copied to the reception region 141 of the second TCM 140. As another example, referring to FIG. 4, e.g., the DMA 250 may copy data written into the transmission region 222 of the first TCM 220 to the reception region 241 of the second TCM 240. The second processor 230 may process the data copied to the reception region 241 of the second TCM 240.

When the address values of the front pointer and the rear pointer are different from each other, the TCM may be re-accessed with a predetermined time lag (S310).

One or more embodiments of a multi-processor device employing frequent accessing of a TCM may determine whether data is stored in the TCM by determining whether address values of a front pointer and a rear pointer are identical to each other. That is, one or more embodiments of a multi-processor device may determine whether data is stored in the TCM without directly reading data stored in the TCM. Thus, one or more embodiments of a multi-processor device may provide improved data processing speed.

One or more embodiments of a multi-processor device employing one or more features described herein may be applied to various types of products. For example, one or more embodiments of a multi-processor device may be applied to electronic devices such as a personal computer (PC), a digital camera, a camcorder, a cellular phone, an MP3 player, a portable multimedia player (PMP), a playstation portable (PSP), and a personal digital assistant (PDA), etc. Further, one or more embodiments of a multi-processor device may be applied to a controller of a storage device such as a memory card, a USB memory, and a solid state drive (SSD).

Figure 11:
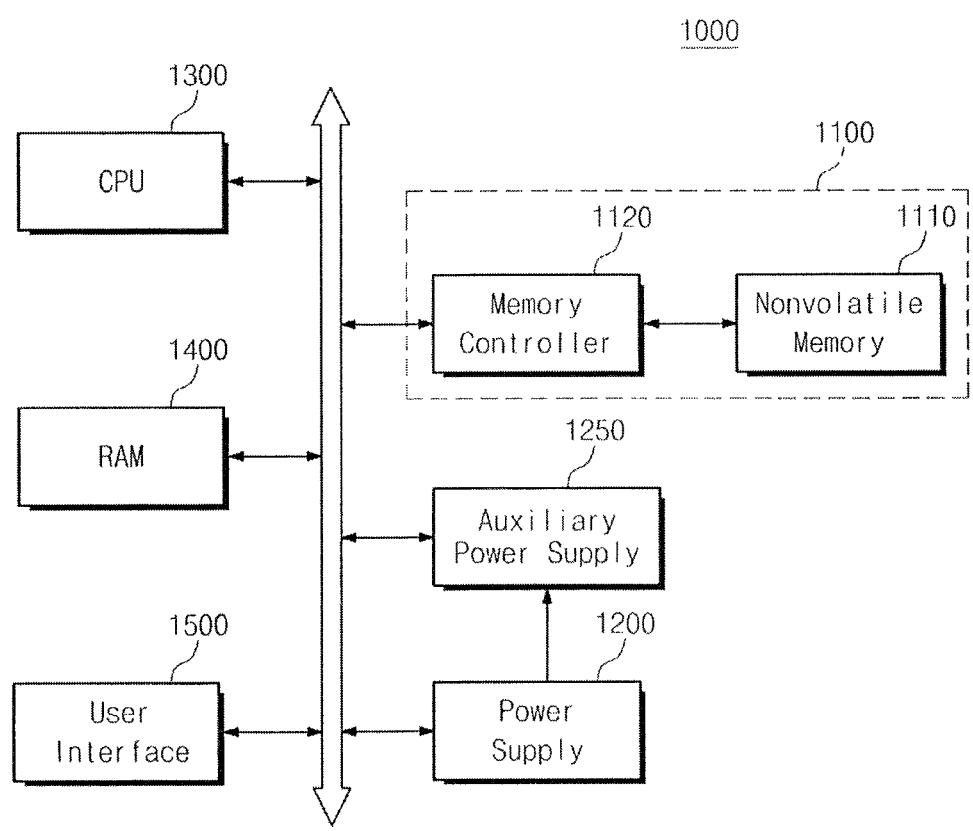
FIG. 11 illustrates a block diagram of an exemplary embodiment of an electric device including a multi-processor device employing one or more features described herein.

FIG. 11 illustrates a block diagram of an exemplary embodiment of an electronic device 1000 including a multi-processor device employing one or more features described herein, e.g., the multi-processor device 100, 200 of FIGS. 1 and FIG. 4, respectively. The electronic device 1000 may be embodied as a personal computer (PC) or a portable electronic device such as a notebook computer, a cellular phone, a personal digital assistant (PDA), a digital camera, etc.

Referring to FIG. 11, the electronic device 1000 may include a semiconductor memory device 1100, a power supply 1200, an auxiliary power supply 1250, a central processing unit (CPU) 1300, a random access memory (RAM) 1400, and a user interface 1500. The semiconductor memory device 1100 may include a flash memory 1110 and a memory controller 1120.

The CPU 1300 shown in FIG. 11 includes a multi-processor device according to an embodiment of the inventive concept. Thus, the CPU 1300 may perform inter-process communication (IPC) using a tightly coupled memory (TCM). Since a shared memory is not used, one or more embodiments may eliminate a write waiting time and data processing speed may be improved.

Figure 12:
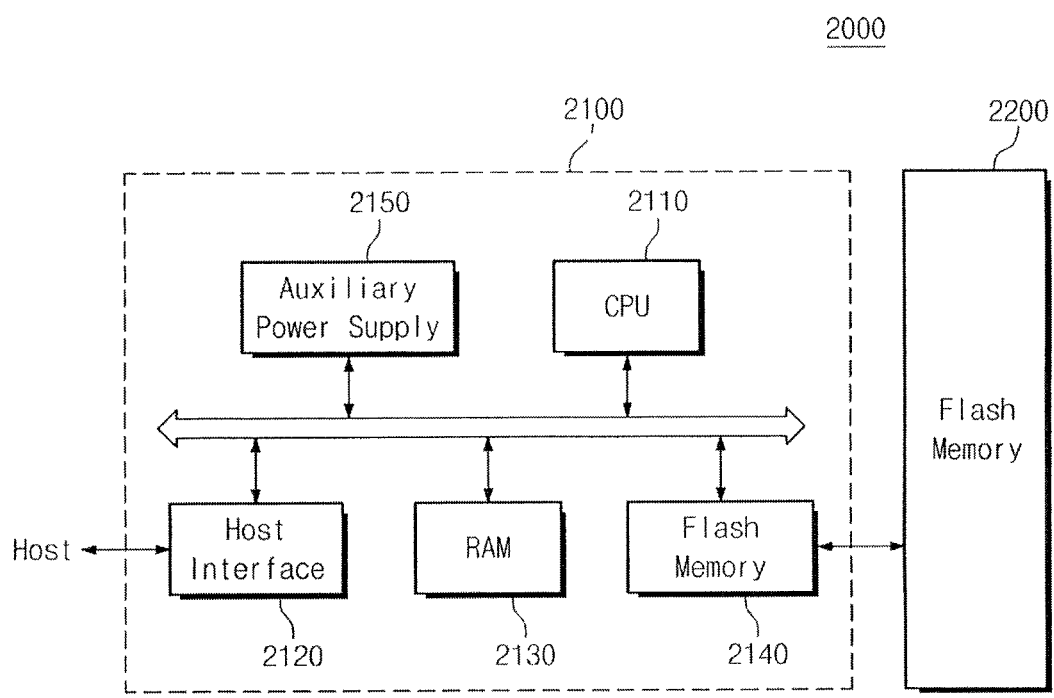
FIG. 12 illustrates a block diagram of an exemplary embodiment of a data storage device including a multi-processor device employing one or more features described herein.

FIG. 12 illustrates a block diagram of an exemplary embodiment of a data storage device 2000 including a multi-processor device employing one or more features described herein, e.g., the multi-processor device 100, 200 of FIG. 1 and FIG. 4, respectively. As illustrated, the data storage device 2000 may include a memory controller 2100 and a flash memory 2200. The data storage device 2000 may include one, some or all storage media such as memory cards (e.g., SD, MMC, etc.) and/or removable storage devices (e.g., USB memory, etc.).

Referring to FIG. 12, the memory controller 2100 may include a central processing unit (CPU) 2110, a host interface 2120, a random access memory (RAM) 2130, a flash interface 2140, and an auxiliary power supply 2150. The auxiliary power supply 2150 may be disposed inside or outside the memory controller 2100.

The data storage device 2000 may be connected to a host to be used. The data storage device 2000 may receive and/or transmit data from or to the host through the host interface 2120. In addition, the data storage device 2000 may receive or transmit data from and/or to the flash memory 2200 through the flash interface 2140. The data storage device 2000 may receive power from the host to perform an internal operation. The data storage device 2000 shown in FIG. 12 may, e.g., be employed as the semiconductor memory device 1100 shown in FIG. 11.

The CPU 2100 shown in FIG. 12 may include a multi-processor device employing one or more features described herein. Thus, the CPU 2100 may perform inter-process communication (IPC) using a tightly coupled memory (TCM). Since a shared memory is not used, one or more embodiments may reduce and/or eliminate a write waiting time and data processing speed may be improved.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A data storage device, comprising:
a nonvolatile memory; and
a controller to control the nonvolatile memory, wherein the controller of the data storage device includes:
 a first processor including a first register;
 a second processor including a second register;
 a direct memory access (DMA);
 a bus commonly connected to the first processor, the second processor, and the DMA;
 a first memory connected to the first processor and coupled to the bus through the first processor; and a second memory connected to the second processor and coupled to the bus through the second processor;
wherein
the DMA is to manage data exchange between the first processor and the second processor through the bus using the first memory and the second memory when an inter-process communication (IPC) operation is performed, wherein
the first memory includes a first transmission region to store a first data to be transmitted to the second memory and a first reception region to store a second data received from the second memory, and
the second memory includes a second transmission region to store the second data to be transmitted to the first memory and a second reception region to store the first data received from the first memory, and
the DMA includes a buffer to temporarily store data received from at least one of the first transmission region and the second transmission region, wherein
the IPC operation including:
a first writing operation during which the first processor stores the first data in the first transmission region from the first register of the first processor, and
a second writing operation during which the second processor stores the second data in the second transmission region from the second register of the second processor.

2. The data storage device as claimed in claim 1, wherein
a writing operation to the first transmission region of the first memory and the second transmission region of the second memory is performed under control of the first processor and the second processor, respectively,
a writing operation to the first reception region of the first memory and the second reception region of the second memory is performed under control of the DMA,
a reading operation to the first transmission region of the first memory and the second transmission region of the second memory is performed under control of the DMA, and
a reading operation to the first reception region of the first memory and the second reception region of the second memory is performed under control of the first processor and the second processor, respectively.

3. The data storage device as claimed in claim 2, wherein the DMA is to copy the first data stored in the first transmission region of the first memory to the buffer and then store the copied first data in the buffer to the second reception region of the second memory.

4. The data storage device as claimed in claim 3, wherein
after the first processor stores the first data into the first transmission region of the first memory, then the first processor transmits a flag signal to the DMA, and wherein
the DMA is to copy the first data stored in the first transmission region of the first memory in response to the flag signal.

5. The data storage device as claimed in claim 1, wherein data in the first memory is managed by using a queue, and the queue comprises:
at least two nodes to store the first data in the first transmission region of the first memory; and
first and second pointers to indicate the at least two nodes, wherein the first and second pointers indicate different node respectively when the first data to be transmitted into the second reception region of the second memory is being stored in the first transmission region of the first memory.

6. The data storage device as claimed in claim 5, wherein the first processor is to store the first data to be transmitted into the second reception region of the second memory in the first transmission region of the first memory and then change the node indicated by the first pointer.

7. The data storage device as claimed in claim 6, wherein the DMA comprises a buffer to temporarily store at least one of the first data received from the first transmission region of the first memory and the second data received from the second transmission region of the second memory, and
wherein the DMA is to copy the first data stored in the first transmission region of the first memory to the buffer and then store the copied first data in the buffer into the second reception region of the second memory, and
wherein the DMA is to change the node indicated by the second pointer after copying the first data stored in the first transmission region of the first memory.

8. The data storage device as claimed in claim 5, wherein the DMA is to check the nodes indicated by the first and second pointers and determine whether the first data to be transmitted into the second reception region of the second memory is being stored in the first transmission region of the first memory by checking the nodes indicated by the first and second pointers are different.

9. The data storage device as claimed in claim 8, wherein the first processor is to change the node indicated by the first pointer after storing the first data to be transmitted into the second reception region of the second memory in the first transmission region of the first memory, and the DMA is to change the node indicated by the second pointer after copying and transferring the first data in the first transmission region of the first memory to the second reception region of the second memory, and
wherein the DMA is to copy the first data in the first transmission region of the first memory when the node indicated by the first pointer is different from the node indicated by the second pointer.

10. An inter-process communication (IPC) method of a data storage device including a nonvolatile memory and a controller to control the nonvolatile memory, the controller of the data storage device including a first processor having a first register, a second processor having a second register, a direct memory access (DMA), a bus commonly connected to the first processor, the second processor and the DMA, a first memory connected to the first processor and coupled to the bus through the first processor, and a second memory connected to the second processor and coupled to the bus through the second processor, wherein the DMA is to manage data exchange between the first processor and the second processor through the bus when the IPC operation is performed, and wherein the first memory includes a first transmission region to store a first data to be transmitted to the second memory and a first reception region to store a second data received from the second memory, and the second memory includes a second transmission region to store the second data to be transmitted to the first memory and a second reception region to store the first data received from the first memory, and the DMA includes a buffer to temporarily store data received from at least one of the first transmission region and the second transmission region, the IPC method comprising:
storing the first data in the first transmission region of the first memory from the first register by the first processor;
storing the second data in the second transmission region of the second memory from the second register by the second processor;

copying the first data stored in the first transmission region of the first memory into the second reception region of the second memory by the DMA; and copying the second data stored in the second transmission region of the second memory into the first reception region of the first memory by the DMA.

11. The IPC method as claimed in claim 10, wherein copying the first data stored in the first transmission region of the first memory into the second reception region of the second memory comprising:

copying the first data stored in the first transmission region of the first memory to the buffer of the DMA; and then storing the copied first data in the buffer of the DMA to the second reception region of the second memory.

12. The IPC method as claimed in claim 10, further comprising:

transmitting a flag signal to the DMA after storing the first data in the first transmission region of the first memory connected to the first processor by the first processor;

copying the first data stored in the first transmission region of the first memory to the buffer of the DMA in response to the flag signal; and storing the copied first data in the buffer of the DMA to the second reception region of the second memory.

13. The IPC method as claimed in claim 10, wherein data in the first memory is managed by using a queue, and the queue comprises at least two nodes to store the first data in the first transmission region of the first memory and first and second pointers to indicate the at least two nodes, the IPC method further comprising:

changing the node indicated by the first pointer after storing the first data to be transmitted into the second reception region of the second memory in the first transmission region of the first memory by the first processor.

14. The IPC method as claimed in claim 13, further comprising:

changing the node indicated by the second pointer after copying the first data stored in the first transmission region of the first memory to the second reception region of the second memory by the DMA.

15. The IPC method as claimed in claim 14, further comprising:

comparing the nodes indicated by the first and second pointers; and determining whether the first data to be transmitted into the second reception region of the second memory is being stored in the first transmission region of the first memory.

16. The IPC method as claimed in claim 15, wherein the DMA is to copy the first data in the first transmission region of the first memory when the node indicated by the first pointer is different from the node indicated by the second pointer.

\* \* \* \* \*